United States Patent [19]

Heubach

[11] Patent Number: 4,541,098
[45] Date of Patent: Sep. 10, 1985

[54] REFRACTORY ELECTRODE BLOCKS WITH IMPROVED RETAINING MEANS

[75] Inventor: Edward C. Heubach, Newark, Ohio

[73] Assignee: Owens-Corning Fiberglas Corporation, Toledo, Ohio

[21] Appl. No.: 603,070

[22] Filed: Apr. 23, 1984

[51] Int. Cl.³ ............................................... C03B 5/27
[52] U.S. Cl. ........................................ 373/36; 373/30
[58] Field of Search ............ 65/DIG. 4, DIG. 6, 355, 65/356; 373/27, 29, 30, 32, 36, 37, 38, 40, 41

[56] References Cited

U.S. PATENT DOCUMENTS 3,683,093  8/1972  Gell et al. ............................... 373/40
4,348,767  9/1982  Farrar ..................................... 373/30

Primary Examiner—A. D. Pellinen
Assistant Examiner—Gregory D. Thompson
Attorney, Agent, or Firm—Ronald C. Hudgens; Philip R. Cloutier; Charles E. Moore

[57] ABSTRACT

An assemblage of electrode blocks peripherally supported on the bottom wall of an electric glass-melting furnace, having apertures for positioning electrodes therethrough and having horizontal grooves cut between adjacent vertical sides with a key positioned in the groove to secure the blocks, and on another of the vertical sides, having a ledge parallel and located between the top and bottom of the electrode blocks, such that a plurality of paving blocks can be positioned to retain the electrode blocks against the bottom wall of the furnace.

5 Claims, 4 Drawing Figures

REFRACTORY ELECTRODE BLOCKS WITH IMPROVED RETAINING MEANS

BACKGROUND OF THE INVENTION

This invention relates to glass production and, more particularly, to electrode blocks and means for anchoring electrode blocks in the bottom wall of an electric glass-melt furnace.

Electric glass melting furnaces have a plurality of submerged electrodes positioned in the furnace in a predetermined pattern, such that when an electric current flows through the molten glass between these electrodes, the glass is heated by the Joule effect. The electrodes are inserted through an aperture in the electrode block located on the bottom wall of the furnace.

A significant problem that has occurred in the operation of such furnaces is the difficulty encountered when the electrodes, through normal wear, require replacement. The replacement practice is to force the worn electrode through and from the electrode block by inserting the new electrode through the bottom of the block. Quite often a great deal of force has to be exerted by an electrode jack in order to move the electrode through the aperture in the electrode block. This force causes the block to loosen and or break and hence, to tend to slip out of place, making it difficult and hazardous to insert replacement electrode into the furnace.

U.S. Pat. No. 4,348,767 describes an application wherein a tapered block is used as a means to restrain the upward force exerted by the electrode jack during replacement. It is the objective of the present invention, however, to provide an improved restraint by keying together the electrode blocks into an assemblage, thereby providing a configuration that causes an interlocking of furnace paving blocks with adjoining electrodes blocks and the bottom wall of the furnace.

SUMMARY OF THE INVENTION

In accordance with the present invention, there is provided an assemblage of electrode blocks for use in the bottom wall of an electric glass-melting furnace comprising a body of refractory material having an aperture for positioning an electrode, the first block having a top and bottom, and two adjacent blocks having vertical sides each with a groove cut therethrough to receive a key, thereby enjoining the first block with the grooved adjacent blocks.

An objective of the invention is an improved apparatus to retain the electrode blocks against the bottom wall of an electric glass-melting furnace.

Other objectives, advantages and applications of the present invention will be made apparent by following the detailed description of the preferred embodiment of the invention.

DETAILED DESCRIPTION OF THE PREFERRED EMBODIMENT

Figure 1:
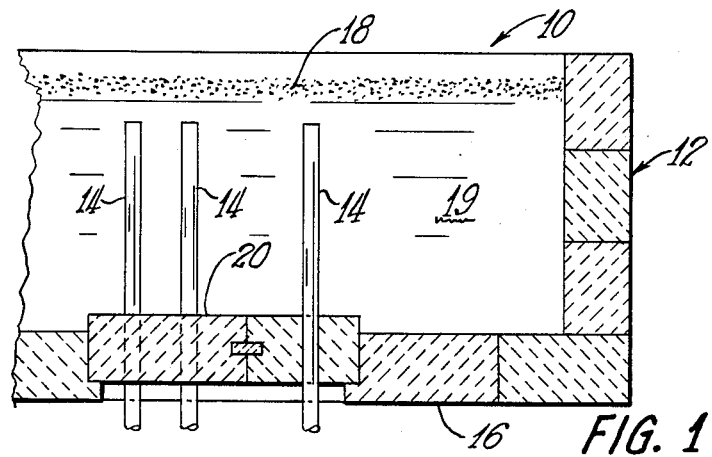
FIG. 1 is a partial diagrammatic view in elevational cross section of an electrically operated, glass-melting furnace utilizing the present invention.

Referring to FIG. 1, an electric glass-melting furnace utilizing the present invention is indicated generally by numeral 10. Furnace 10 has a melting tank 12 with a plurality of electrodes 14 extending upwardly through the bottom wall 16 thereof. Electrodes 14 are suitably positioned throughout tank 12 in any desired pattern, as for example, in the configuration disclosed in U.S. Pat. No. 3,634,588. Electrodes 14 are supplied with power from a controlled source (not shown) which causes a current to flow between electrodes 14, thereby melting the batch material 18 to form a pool of molten glass 19. The molten glass 19 flows into a forehearth region (not shown) to a glass fiber production means.

Figure 3:
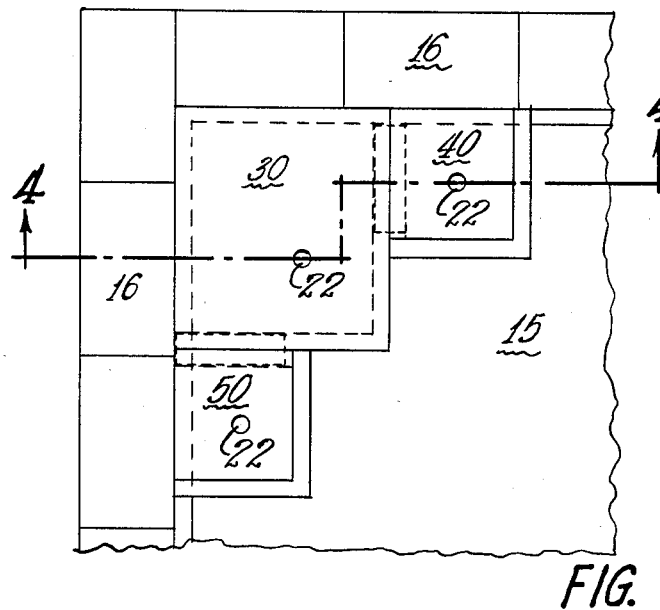
FIG. 3 is a diagrammatic plan view of the assemblage of refractory electrode blocks.

Referring to FIGS. 1 and 3, an assemblage of electrode blocks 20, having apertures 22 located therein, suitably sized to allow positioning of electrodes 14 therethrough, are peripherally supported on the bottom wall 16, and are made of fused cast refractory material such as alumina, zirconia and silica.

Figure 2:
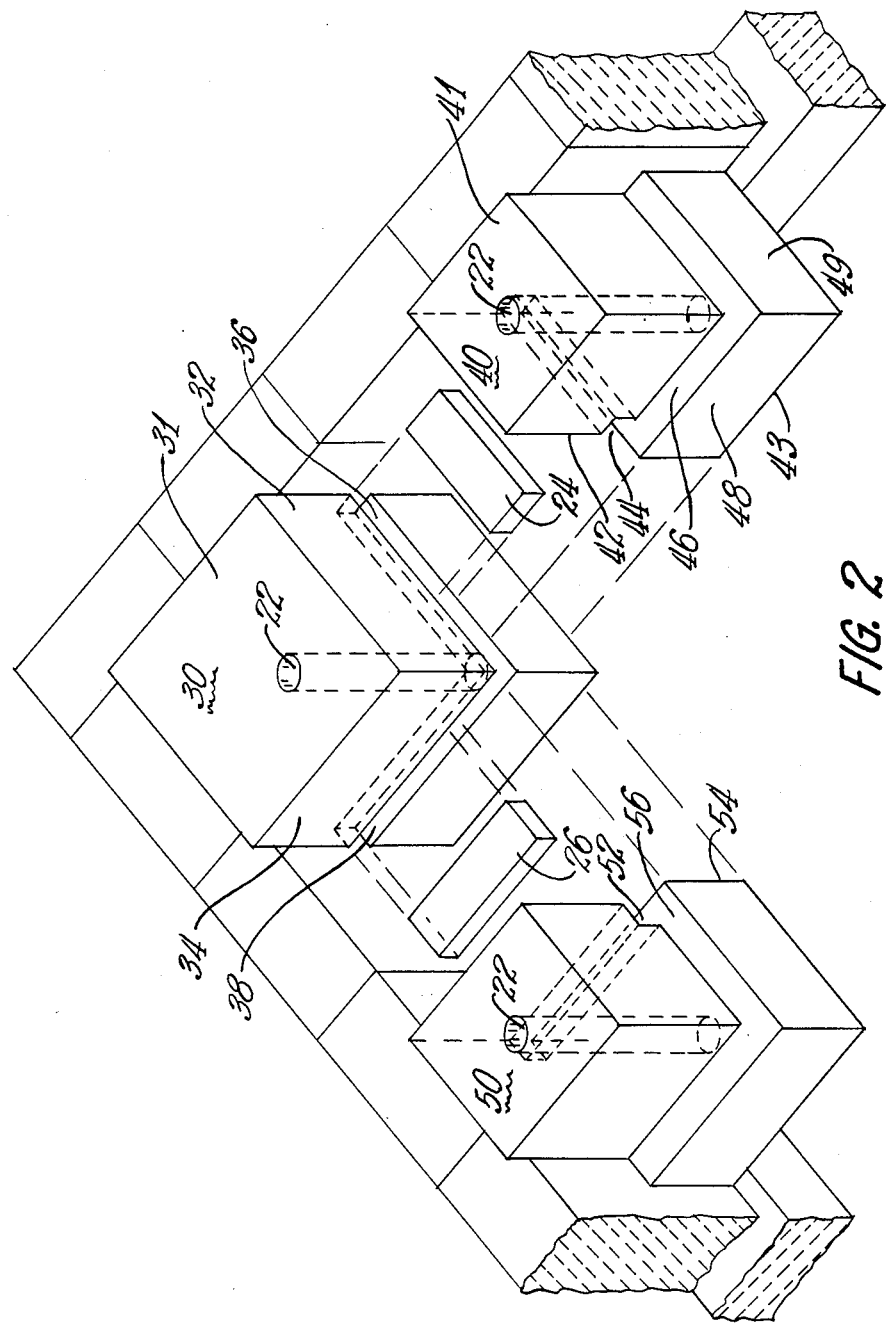
FIG. 2 is an exploded view of the electrode blocks prior to assembly.

Referring now to FIG. 2, the center electrode block 30, or apex of the assemblage 20, is rectangular and generally larger than blocks 40 and 50. On each of two adjacent sides 32 and 34 of electrode block 30, grooves 36 and 38 are cut therethrough, parallel to the top 31, to receive keys 24 and 26. The keys 24 and 26 are fabricated from a refractory material composed of alumina, zirconia and silica.

A second electrode block 40, has a side 42 adjacent block 30 and a groove 44 cut therethrough so as to be in mating relation with side 32 of block 30 and to receive key 24 and thereby enjoining the two blocks. In addition, block 40 has a ledge 46 parallel to top 41 and located between the top 41 and bottom 43 of side 48, which is generally perpendicular to the plane of side 32 of electrode block 30. In the configuration shown in FIG. 2, ledge 46 extends to adjacent side 49 of block 40.

Modifications of this arrangement can be made to suit the individual requirements of the assemblage of electrode blocks.

The third electrode block 50 is similar to block 40 in that it is keyed to block 30 through key 26 in grooves 38 and 52 of mating sides 34 and 54 respectively.

Figure 4:
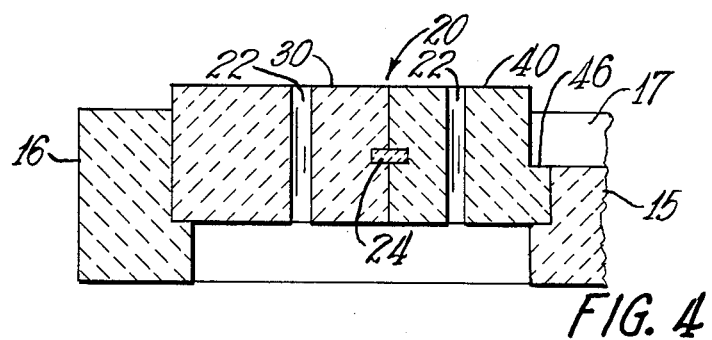
FIG. 4 is a sectional view along line 4—4 of FIG. 3.

The sectional view of FIG. 4 depicts the peripheral support of the assemblage of electrode blocks 20 within the bottom wall 16 and bottom blocks 15 of the electric glass-melting furnace 10. In addition, one of the interlocking keys 24 is shown in mating relation with adjacent electrode blocks 30 and 40. The paving block 17 is positioned on ledge 46, over bottom support block 15, to restrain the electrode block assemblage 20 against the support blocks 15 and bottom wall 16.

Utilizing the assemblage of electrode blocks 20 as described herein, an upward force exerted on any one of the electrodes 14 which are inserted through apertures 22 of the assemblage of electrode blocks 20 causes an interacting, unitary binding of electrode blocks 30, 40, and 50 with the bottom wall 16, bottom support blocks 15, and the hold-down paving 17 of the melter. Accordingly, the present invention facilitates insertion of electrodes 14 into the melting tank thereby insuring efficient operation of the furnace, personnel safety, and reduced chance of damage to the structure of the furnace.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. An electric glass-melting furnace having a bottom wall comprising:
   a. an assemblage of electrode blocks peripherally supported on the bottom wall of said furnace through which electrodes are inserted;
   b. a first electrode block having an aperture for positioning an electrode therethrough and having a top and four sides perpendicular to said top, wherein a first and second side being adjacent one another, have a groove cut therethrough parallel to the top;
   c. a second electrode block having an aperture for positioning an electrode therethrough and having a top, bottom, and a first side perpendicular to said top, said first side having a groove cut therethrough in mating relation with said first side of said first block, and a second side, adjacent the first side, having a ledge parallel to and located between the top and bottom of said second block;
   d. a third electrode block having an aperture for positioning an electrode therethrough and having a top, bottom, and a first side perpendicular to said top, said first side having a groove cut therethrough in mating relation with said second side of said first block, and a second side adjacent to the first side having a ledge parallel to and located between the top and bottom of said third block;
   e. a first key positioned in the groove formed between the first sides of the first and second blocks, and a second key positioned in the groove formed between the first side of the third block and the second side of the first block, thereby enjoining said blocks; and
   f. a plurality of paving blocks positioned on said ledges to retain said electrode blocks against the bottom wall of said furnace.

2. The electric furnace as defined in claim 1 wherein the first electrode block is larger than the second and third blocks, and is located at the apex of the assemblage.

3. The electric furnace as defined in claim 1 wherein the key does not extend beyond the perpendicular side or onto the ledge of the second or third block.

4. The electric furnace as defined in claim 1 wherein the electrode blocks and keys are of a refractory material made from a composition of alumina, zirconia, and silica.

5. A method of retaining electrode blocks against the bottom wall of an electric glass-melting furnace comprising: inserting a key in a groove cut in each of the adjacent vertical walls of at least two of the electrode blocks; and positioning paving blocks on ledges carved into opposite and adjacent walls of the keyed electrode blocks.

* * * * *